United States Patent

[11] 3,626,307

| | | | |
|---|---|---|---|
| [72] | Inventor | Morito Koyama<br>Tokyo, Japan | |
| [21] | Appl. No. | 7,905 | |
| [22] | Filed | Feb. 2, 1970 | |
| [45] | Patented | Dec. 7, 1971 | |
| [73] | Assignee | Iwasaki Tsushinki Kaisha (a/k/a Iwatsu Electric Co., Ltd.)<br>Tokyo-to, Japan | |
| [32] | Priorities | Feb. 14, 1969 | |
| [33] | | Japan | |
| [31] | | 44/10916;<br>Feb. 14, 1969, Japan, No. 44/10917 | |

[54] COUNTING SYSTEM FOR MEASURING A DIFFERENCE BETWEEN FREQUENCIES OF TWO SIGNALS
3 Claims, 7 Drawing Figs.

[52] U.S. Cl............................................. 328/133,
307/295, 307/210, 328/46, 307/233
[51] Int. Cl. ............................................. H03d 13/00
[50] Field of Search ........................................ 328/133,
134, 14, 46; 307/233, 295, 210

[56] References Cited
UNITED STATES PATENTS

| | | | |
|---|---|---|---|
| 3,182,292 | 5/1965 | Schmid....................... | 328/133 |
| 3,187,195 | 6/1965 | Stefanor...................... | 328/133 |
| 3,286,176 | 11/1966 | Birnboim..................... | 328/133 |
| 3,327,226 | 6/1967 | Nourney...................... | 307/233 |
| 3,328,688 | 6/1967 | Brooks........................ | 328/133 |
| 3,418,585 | 12/1968 | Harvett....................... | 328/134 |
| 3,509,476 | 4/1970 | Roth............................ | 307/295 |

Primary Examiner—Donald D. Forrer
Assistant Examiner—Ro E. Hart
Attorneys—Robert E. Burns and Emmanuel J. Lobato ABSTRACT: A counting system for measuring a difference between respective frequencies of the first input signal and the second input signal, where the first and second input signals are converted to a first pulse train whose pulses are each timed with each of the cycles of the first input signal and to a second pulse train whose pulses are each timed with each of the cycles of the second input signal; the first pulse train and the second pulse train are applied to a sequential logical circuit having three possible states to generate an output pulse in response to every received pulse of at least one of the first and second pulse trains so as to obtain output pulses the number of which corresponds to the difference between the numbers of received pulses of the first and second pulse trains; and the number of output pulses of the sequential logical circuit is counted by a counter to obtain the difference desired.

PATENTED DEC 7 1971

COUNTING SYSTEM FOR MEASURING A DIFFERENCE BETWEEN FREQUENCIES OF TWO SIGNALS

This invention relates to counting systems for measuring a difference between frequencies of two signals.

In the field of automatic control or measurement in industry, etc., the measurement of a value corresponding to a difference between two values is frequently necessary. If each of these two values is frequency information or information convertible to frequency information, the measurement of the difference between the two values has been performed in accordance with the following principle in the art.

In one of these conventional systems, the frequency of a beat signal having a frequency equal to a difference between two frequencies $F_1$ and $F_2$ is counted. In this system, a frequency mixer, a detector for the beat signal, a low-pass filter and amplifiers are necessary as well as a frequency counter. Moreover, the frequency range of the two input frequencies $F_1$ and $F_2$ is limited by the cutoff frequency of the low-pass filter. Furthermore, if the difference between the two input frequency $F_1$ and $F_2$ is very small, the amplifier must amplify a very low frequency signal nearly equal to direct current.

In another of the conventional systems, a reversible counter is employed to count the difference frequency in such a manner that the reversible counter counts at first the frequency of one (e.g., $F_1$) of the two input signals in the plus direction and then counts the frequency of the other (e.g., $F_2$) of the two input signals in the minus direction. As the result of the above counting operation, the difference between frequencies ($F_1$ and $F_2$) of the two input signals can be obtained. However, the reversible counter is necessary in this system.

An object of this invention is to provide a counting system capable of measuring a difference between frequencies of two signals by the use of a simple counter counting the input pulses thereof in the unidirection.

In accordance with the feature of this invention, output pulses the number of which corresponds to the difference between frequencies of two input signals are produced in a simple signal converter. Accordingly, the difference between frequencies of two input signals can be readily measured by counting the number of the output pulses by the use of a simple counter. Since a reversible counter used in the conventional system is not necessary in the system of this invention, the circuitry of this invention is simpler in construction in comparison with the conventional system. Moreover, since a filter used in the conventional system is not necessary in the system of this invention, the system of this invention can measure the difference between frequencies of two input signals in a wide frequency range.

The principle of this invention will be better understood from the following more detailed discussion in conjunction with the accompanying drawings, in which the same or equivalent parts are designated by the same or equivalent numerals, characters, and symbols, and in which.

Figure 1:
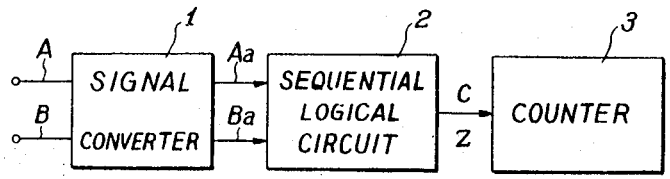
FIG. 1 is a block diagram illustrating the construction of the system of this invention.

With reference to FIG. 1, the system of this invention comprises a signal converter 1, a sequential logical circuit 2 and a counter 3.

The signal converter 1 converts a first input signal A and a second input signal B to a first pulse train $Aa$, whose pulses are each timed with each of the cycles of the first input signal A, and to a second pulse train $Ba$, whose pulses are each timed with each of the cycles of the second input signal B respectively. Each of the first input signal A and the second input signal B is a sinusoidal wave by way of example. The conditions of the first and second pulse trains $Aa$ and $Ba$ and determined in consideration of the kind of logical elements forming the sequential logical circuit 2 connected in cascade with the signal converter 1.

Figures 2, 3:
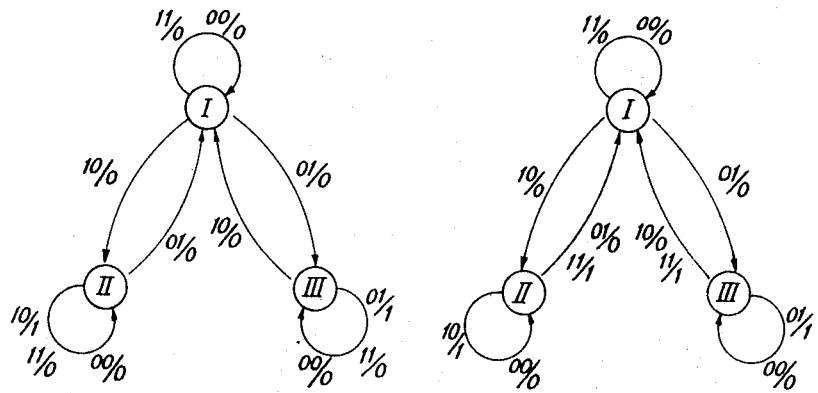
FIGS. 2 and 3 are state diagrams explanatory of the operation of a sequential logical circuit used in the system of this invention.

The sequential logical circuit 2 has three possible states I, II and III as shown in FIG. 2, which is a state diagram explanatory of the logical operation of the sequential logical circuit 2. In FIG. 2, three small circles show three possible states of the sequential logical circuit 2 as known in the art and references I, II and III are used for identifying the state I, the state II and the state III respectively. The direction of transition between two of the states I, II and III is indicated by arrows. The states of two pulse trains $Aa$ and $Ba$ and the number $z$ of an output pulse which are the factors of each of the transitions are indicated at the left side and the right side of an oblique line (/) with respect to each of the arrows.

In this case, the state I is a reset state or a state in which an output pulse or output pulses the number of which corresponds to a difference between the numbers of received pulses of the pulse trains $Aa$ and $Ba$ (i.e., frequency difference between the two input signals A and B) has/have been generated. The state II is a state in which, when the number of received pulses of the pulse train $Aa$ is larger than the number of received pulses of the pulse train $Ba$, only one pulse obtained from the output pulses the number of which corresponds to the difference between the numbers of received pulses of the pulse trains $Aa$ and $Ba$ is held after sending out all of other output pulses. The state III is a state obtained when the number of received pulses of the pulse train $Ba$ is larger than the number of pulses of the pulse train $Aa$. Other condition of the state III is the same as the state II.

In other words, if it is assumed that a difference between the respective numbers of pulses of the pulse trains $Aa$ and $Ba$ received in a time is a value $d$ and that the number of output pulses C generated in this condition is a number $z$, the following equations 1 and 2 are satisfied with respect to the state I and the states II and III respectively:

| state I: | $d-z=0$ | (1) |
|---|---|---|
| states II and III: | $d-z=1$ | (2) |

With reference to FIG. 2, the operation of the sequential logical circuit 2 will now be described. In the state I of this sequential logical circuit 2, if the pulse trains $Aa$ and $Ba$ assume states 1 and 1 respectively (in other words, a pulse is obtained in each of the pulse trains $Aa$ and $Ba$ at the same time), the number $z$ of output pulses is zero (i.e., no output pulses C) and this state I is not changed since the difference $d$ between the respective numbers of received pulses of the pulse trains $Aa$ and $Ba$ is still zero as shown in the equation 1. In the state I, if the pulse trains $Aa$ and $Ba$ assume states 1 and 0 respectively, the state I transfers to the state II since a pulse is obtained at the pulse train $Aa$ only. In this case, the difference $d$ is equal to one. Accordingly, if it is assumed that the number $z$ of output pulses is zero, the equation 2 will be satisfied. Moreover, if the pulse trains $Aa$ and $Ba$ assume states 0 and 1 respectively in the state I of the sequential logical circuit 2, the number $z$ of output pulses is also zero to meet the condition shown in the equation 2.

In the state II of the sequential logical circuit 2, if the pulse trains $Aa$ and $Ba$ assume states 1 and 1 respectively, no output pulse is generated and the state II is not changed since the condition shown in the equation 2 is not changed. In the same state II if the pulse trains $Aa$ and $Ba$ assume states 1 and 0 respectively, one output pulse C is generated so as to meet the condition shown in the equation 2 but the state II is not changed since the difference $d$ increases by one. Moreover, if the pulse trains $Aa$ and $Ba$ assume states 0 and 1 respectively in the same state II of the sequential logical circuit 2, the sequential logical circuit 2 changes the state II to the state I without any output pulse. The reason for this operation is that, since the state II holds one pulse obtained from the output pulses the number of which corresponds to the difference between the respective numbers of received pulses of the pulse trains $Aa$ and $Ba$ after sending out all of other output pulses, the received one pulse of the pulse train $Ba$ is cancelled by the held one pulse when the pulse trains $Aa$ and $Ba$ assume states 0 and 1 respectively as mentioned above. As the result of this operation, the difference $d$ shown in the equation 2 decreases by one so that the sequential logical circuit 2 changes the state II to the state I without any output since the equation 1 is satisfied.

The operation of the sequential logical circuit 2 in the state III can be readily understood by reference to the operation in the state II by replacing the state II by the state III and the pulse train $Aa$ (or $Ba$) by the pulse train $Ba$ (or $Aa$) respectively. Accordingly, details are omitted.

FIG. 3 shows another example of the state diagram of the sequential logical circuit 2. In this state diagram, each of the states II and III is changed to the state I after generation of one output pulse C when both the pulse trains $Aa$ and $Ba$ assume the state 1 as shown by notation (11/1), while each of the states II and III is not changed without generation of any output pulse C in the same input condition in the state diagram shown in FIG. 2 by notation (11/0). However, the state diagrams shown in FIGS. 2 and 3 have equivalent functions with respect to each other to perform operation in which the output pulse or pulses C the number $z$ of which corresponds to the difference between respective pulses of the two input pulse trains $Aa$ and $Ba$ is/are generated.

In each of the state diagrams shown in FIGS. 2 and 3, each of the states I, II and III is not changed without any output pulse when both the input pulse trains $Aa$ and $Ba$ assume the state 0 (i.e., no input pulse). This is quite in the nature of things in consideration of the characteristic of the sequential logical circuit 2.

The sequential logical circuit 2 can be considered as a signal converter converting the difference $d$ between the numbers of pulses of two pulse trains applied respectively to two input terminals thereof to the number $z$ of the output pulse. In this case, conversion error $(d-z)$ is as follows.

In a case where the operation of the sequential logical circuit 2 starts from the state I, if the last state thereof is the same state I, the conversion error in this conversion time is zero as shown in the equation 1: $(d-z=0)$. However, if the last state thereof is the state II or III, the conversion error in this conversion time is one as shown in the equation 2:$(d-z=1)$. This error is held in the sequential logical circuit 2 as mentioned above.

In a case where the operation of the sequential logical circuit 2 starts from the state II or III, the conversion error varies in accordance with the last state, successively assumed states in the conversion time, and states of pulses of the pulse trains $Aa$ and $Ba$ (especially in the transition from the state II or III to the state I in the state diagram shown in FIG. 3). This conversion error cannot be determined in a simple principle as the operation starting from the state I. However, the conversion error $(d-z)$ is zero, plus one or minus one. An example of the case where the conversion error $(d-z)$ is minus one is a case where the pulse trains $Aa$ and $Ba$ applied to the sequential circuit 2 having the state II assume at first the states 1 and 0 and then assume the state 0 and 1 respectively. In this case, the sequential logical circuit 2 generates at first one pulse (i.e., $z=1$) without change of the state II and then changes the state II to the state I without generation of any output pulse (i.e., $z=0$). While the difference $d$ in this conversion time is zero because of the input states "1 0" and "0 1," the conversion error $(d-z)$ becomes minus one since the number of output pulses in this conversion time is one. Another example of the case where the conversion error $(d-z)$ is minus one is a case where both the input pulse trains $Aa$ and $Ba$ assume the same state 1 in the starting state II in the state diagram shown in FIG. 3. In this case, the state II is changed to the state I after generation of one pulse (i.e., $z=1$). However, if the input pulse trains $Aa$ and $Ba$ assume respectively the states 1 and 0 at the starting state II, the number $z$ of output pulses C is one so that the conversion error $(d-z)$ is zero. Moreover, if the input pulse trains $Aa$ and $Ba$ assume respectively the states 0 and 1 at the same starting state II, the number $z$ of output pulses C is zero so that the conversion error $(d-z)$ is one.

In a case where the operation of the sequential logical circuit 2 is always started from the starting state I, it is possible to change the above-mentioned conversion error $(d-z=1)$ to zero. In the sequential logical circuit 2 defined by the state diagram shown in FIG. 3, false input signals of the states I and 1 are applied to eliminate the conversion error after disconnection of the input pulse trains $Aa$ and $Ba$ from this circuit 2 when the measurement of the difference $d$ has been performed. In this case, if the circuit 2 assumes the state II or III, the state of the circuit 2 is changed to the state I and the held one pulse is sent out to the output. However, if the circuit 2 assumes the state I, this state I of the circuit 2 is not changed and no output pulse is generated. As the result of the above operation, the conversion error $(d-z)$ can be eliminated in the sequential logical circuit 2 defined by the state diagram shown in FIG. 3. In this case, clear operation or reset operation is not necessary to provide for the succeeding operations. In the sequential logical circuit 2 defined by the state diagram shown in FIG. 2, another means is necessary to disconnect the input pulse trains $Aa$ and $Ba$ from the sequential logical circuit 2 when the measurement of the difference $d$ has been performed and to generate one output pulse if the state of the sequential logical circuit 2 is the state II or III.

As mentioned above, the sequential circuit 2 has three possible states I, II and III and generates an output pulse in response to every received pulse of at least one of the first pulse train $Aa$ and the second pulse train $Ba$ in a predetermined condition which is determined in accordance with the instant state (I, II or III) of this sequential logical circuit 2 and the instant state (0 1; 1 0; and 1 1) of the first pulse train $Aa$ and the second pulse train $Ba$. In other words, the operation of the sequential logical circuit 2 is started from the state I; and the sequential logical circuit 2 assumes the state I when the difference between the respective numbers of received pulses of the first and second pulse trains $Aa$ and $Ba$ is equal to the number of generated output pulse or pulses, the state II when the difference is larger than the number of generated output pulse or pulses and when the number of received pulses of the first pulse train $Aa$ is larger than the number of received pulses of the second pulse train $Ba$, and the state III when the difference is larger than the number of generated output pulse or pulses and when the number of received pulses of the first pulse train $Aa$ is smaller than the number of received pulses of the second pulse train $Ba$. The number of generated output pulses at the transition to the state II or III is less, by one, than the difference. In accordance with the above conditions, the sequential logical circuit 2 generates output pulses the number of which corresponds to the difference between the respective numbers of received pulses of the first pulse train $Aa$ and the second pulse train $Ba$.

Figure 4:
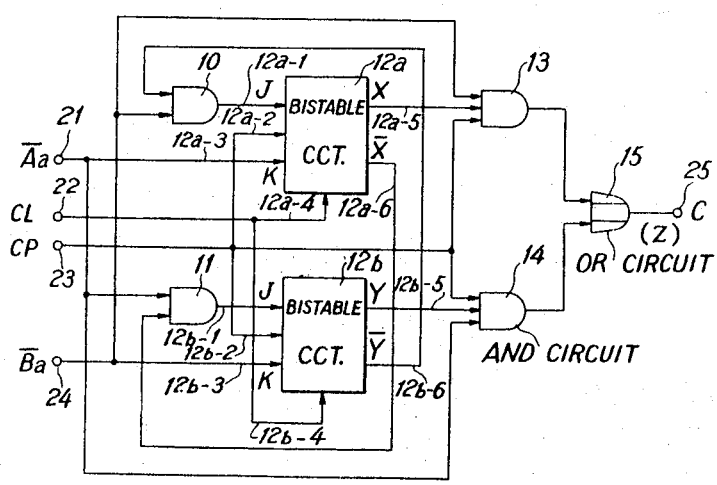
FIG. 4 is a block diagram illustrating an example of the sequential logical circuit defined by the state diagram shown in FIG. 2.

An example of the sequential logical circuit 2 defined by the state diagram shown in FIG. 2 will now be described with reference to FIG. 4. This example comprises four AND-circuits 10, 11, 13 and 14 each of which generates an output if all of inputs of the corresponding AND circuit assume the plus state (i.e.; the state 1), two bistable circuits 12a and 12b, such as flip-flop circuit, and an OR-circuit 15 generating an output if any of inputs of this OR-circuit 15 assumes the plus state (i.e., the state 1) Since three discrete states I, II and III are necessary in accordance with the above-mentioned state diagram shown in FIG. 2, the two bistable circuits 12a and 12b are employed to provide two bits of memory elements. In this example, two inputs $\bar{A}a$ and $\bar{B}a$ which are respectively NOT signals of the pulse trains $Aa$ and $Ba$ are applied to input terminals 21 and 24 respectively. These inputs $\overline{A}a$ and $\overline{B}a$ can be obtained by inverting the polarities of the pulse trains $Aa$ and $Ba$ respectively. The state I of this sequential logical circuit 2 corresponds to reset states of both the bistable circuits 12$a$ and 12$b$; the state II to the set state of the bistable circuit 12$a$ and the reset state of the bistable circuit 12$b$; and the state III to the reset state of the bistable circuit 12$a$ and the set state of the bistable circuit 12$b$.

Figure 5:
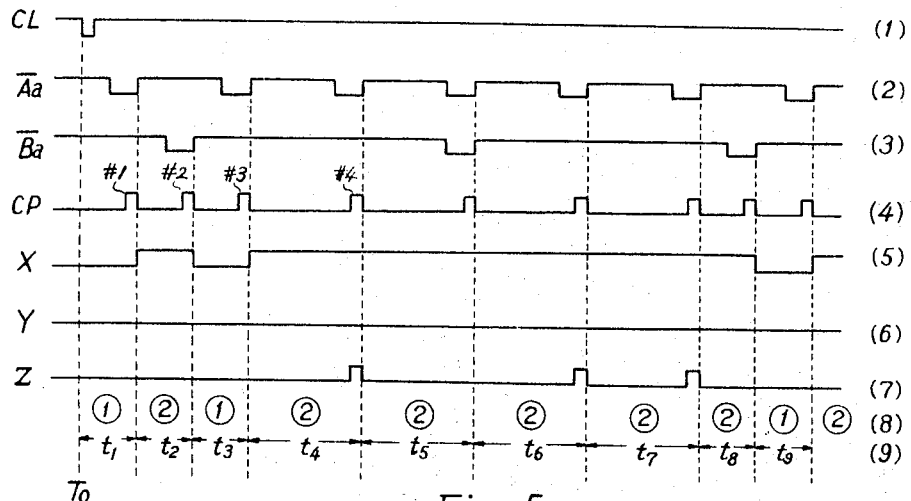
FIG. 5 is a time chart explanatory of the operation of the sequential logical circuit shown in FIG. 4.

In the signal converter 1 connected to this sequential logical circuit 2 generates the pulse signals $\overline{A}a$ and $\overline{B}a$ whose pulses are each timed with each of the cycles of corresponding one of the first input signals A and B, and clock pulses CP generated in accordance with time chart 4 shown in FIG. 5. Each of the clock pulses CP is generated after a constant delay time from the start of each of the minus pulses of the input pulses $\overline{A}a$ and $\overline{B}a$ of the sequential logical circuit 2. Moreover, the end of each of the clock pulses CP is timed (or delayed by a constant time from) with the end of each of pulses of the pulse signals $\overline{A}a$ and $\overline{B}a$ as shown by dotted lines in FIG. 5. Furthermore, the states of the pulse signals $\overline{A}a$ and $\overline{B}a$ must not varied in the duration of each of the clock pulses CP. These conditions of the clock pulses CP are necessary for the normal operations of the bistable circuits 12$a$ and 12$b$ used in the example shown in FIG. 4. The duration of each of pulses of the pulse signals $\overline{A}a$ and $\overline{B}a$ must be shorter than the period of the highest frequency in the input signals A and B so as to meet a requirement in which more than two of the clock pulses CP are not included in the duration of each of pulses of the pulse signals $\overline{A}a$ and $\overline{B}a$.

With reference to FIG. 5, the operation of this example of the sequential logical circuit shown in FIG. 4 will be described. At first, this circuit is reset at the start of a time $t$, to the state I by a clear signal CL shown at the time chart 1 in FIG. 5. This reset operation is not essential but performed if the aforementioned conversion error ($d$-$z$) must be eliminated. In the time $t_1$, the first pulse train $Aa$ and the second pulse train $Ba$ assume respectively the states 1 and 0, which are shown respective states 0 and 1 of the pulse signals $\overline{A}a$ and $\overline{B}a$ in FIG. 5. The output X of the bistable circuit 12$a$ is changed to the high potential (hereinafter called as the state 1) in response to a clock pulse #1 generated at the end of the time $t_1$. At the same time, another output $\overline{X}$ of the bistable circuit 12$a$ is changed to the low potential (hereinafter called as the state 0). This condition is the reset state of the bistable circuit 12$a$. In this case, since both the two inputs $\overline{Y}$ and $\overline{B}a$ of the AND-circuit 10 assume the state 1 at the start of the clock pulse #1, the J-input of the bistable circuit 12$a$ obtained at the output 12$a$-1 of the AND-circuit 10 assumes also the state 1. Moreover, since the K-input of the bistable circuit 12$a$ corresponding to the pulse signal $Aa$ assumes the state 0 at the end of the time $t_1$, the bistable circuit 12$a$ is set in response to the end of the clock pulse 1. On the other hand, since the output of the AND-circuit 11 applied to the J-input of the bistable circuit 12$b$ assumes the state 0 because of the state 0 of the pulse signal $\overline{A}a$ while the K-input of the bistable circuit 12$b$ corresponding to the pulse signal $\overline{B}a$ assumes the state 1, the bistable circuit 12$b$ is maintained at the reset state. In inputs of the AND-circuits 13 and 14, since respective outputs X and Y of the bistable circuits 12$a$ and 12$b$ assume the state 0 at the time $t_1$, both the AND-circuits 13 and 14 generate no output so that the output of the OR-circuit 15 is also the state 0. As mentioned above, the state of this circuit is changed to the state II at the end of the time $t_1$ from the state I since the bistable circuit 12$b$ is reset.

In a time $t_2$, the first pulse train $Aa$ and the second pulse train $Ba$ assume respectively the states 0 and 1 (i.e., states 1 and 0 of the pulse signals $\overline{A}a$ and $\overline{B}a$) in the state II of the sequential logical circuit 2. In this case, since the J-input of the bistable circuit 12$a$ corresponding to the output of the AND-circuit 10 assumes the state 0 because of the state 0 of the input $\overline{B}a$ of the AND-circuit 10 while the K-input of the bistable circuit 12$a$ corresponding to the pulse signal $\overline{A}a$ assumes the state 1, the bistable circuit 12$a$ is reset at the end of the time $t_2$. Moreover, since the J-input of the bistable circuit 12$b$ corresponding to the output (12$b$-1) of the AND-circuit 11 assumes the state 0 because of the state 0 of the output $\overline{X}$ of the bistable circuit 12$a$ while the K-input of the bistable circuit 12$b$ corresponding to the pulse signal $\overline{B}a$ assumes the state 0, the state of the bistable circuit 12$b$ is not changed from the reset state. Accordingly, the state of this sequential logical circuit 2 is changed from the state II to the state I at the end of the time $t_2$. In this case, since the input $\overline{B}a$ of the AND-circuit 13 and the input Y of the AND-circuit 14 are all the state 0 none of these AND-circuits 13 and 14 generates output pulses so that the output of the OR-circuit 15 assumes the state 0.

In a time $t_3$, the pulse trains $Aa$ and $Ba$ assume respectively states 1 and 0 (i.e., states 0 and 1 of the pulse signal $\overline{A}a$ and $\overline{B}a$) in the state I of the sequential logical circuit 2. This is the same as the time $t_1$, so that the state I of the sequential logical circuit 2 is changed to the state II without generation of the output pulse C.

In a time $t_4$, the pulse trains $Aa$ and $Ba$ assume respectively states 1 and 0 (i.e., states 0 and 1 of the pulse signal $\overline{A}a$ and $\overline{B}a$) in the state II of the sequential logical circuit 2. In this case, since the J-input of the bistable circuit 12$a$ assumes the state 1 because of the states 1 of both the two inputs of the AND-circuit 10 while the K-input of the bistable circuit 12$a$ assumes the state 0, the bistable circuit 12$a$ assumes the set state at the end of the time $t_4$. On the other hand, since the J-input of the bistable circuit 12$b$ assumes the state 0 because of the state 0 of the input ($\overline{A}a$) of the AND-circuit 11 while the K-input of the bistable circuit 12$b$ assumes the state 1, the bistable circuit is maintained at the reset state. Accordingly, the sequential logical circuit 2 is maintained at the state II. However, since both the output X of the bistable circuit 12$a$ and the pulse signal $\overline{B}a$ assume the state 1, the output of the AND-circuit 13 assumes the state 1 only at the duration of a clock pulse #4 generated at the last of the time $t_4$ so that an output pulse C is generated to the output terminal 25 of the OR-circuit 15.

In a time $t_5$, the pulse trains $Aa$ and $Ba$ assume respectively states 1 and 1 (i.e., states 0 and 0 of the pulse signals $\overline{A}a$ and $\overline{B}a$) in the state II of the sequential logical circuit 2. In this case, since all of the J-inputs and the K-inputs of the bistable circuits 12$a$ and 12$b$ assume the state 0 because of states 0 and 0 of the pulse signals $\overline{A}a$ and $\overline{B}a$, the state of the sequential logical circuit 2 is maintained at the same state II as the time $t_4$. The output pulse C is not generated at this time since the inputs ($\overline{A}a$ and $\overline{B}a$) of the AND-circuits 13 and 14 assume the state 0.

In times $t_6$ and $t_7$, the pulse trains $Aa$ and $Ba$ assume respectively 1 and 0 (i.e., states 0 and 1 of the pulse signals $\overline{A}a$ and $\overline{B}a$) in the state II of the sequential logical circuit 2. This is the same as the time $t_4$, so that one output pulse C is generated at the end of each of the times $t_6$ and $t_7$ while the state II of the sequential logical circuit 2 is maintained without change.

In a time $t_8$, the pulse trains $Aa$ and $Ba$ assume respectively 0 and 1 (i.e., states 1 and 0 of the pulse signals $\overline{A}a$ and $\overline{B}a$) in the state II of the sequential logical circuit 2. This is the same as the time $t_2$, so that no output pulse C is generated while the state II of the sequential logical circuit 2 is changed to the state I.

In a time $t_9$, the pulse trains $Aa$ and $Ba$ assume respectively 1 and 0 (i.e., states 0 and 1 of the pulse signals $\overline{A}a$ and $\overline{B}a$) in the state I of the sequential logical circuit 2. This is the same as the time $t_1$ or $t_3$, so that no output pulse C is generated while the state I of the sequential logical circuit 2 is changed to the state II.

In accordance with the above-mentioned operations started from the resetting time $T_0$, the aforementioned conversion error ($d$–$z$) is successively one, zero, one, one, one, one, one, zero and one at the ends of the times $t_1$, $t_2$, $t_3$, $t_4$, $t_5$, $t_6$, $t_7$, $t_8$ and $t_9$.

The number of output pulses of the sequential logical circuit 2 is counted by the counter 3. If the counting time of the counter 3 is 1 second, the counting result of the counter 3 indicates directly the frequency difference between the two input signals A and B. However, if the counting time of the counter 3 is 10 seconds, the counting result of the counter 3 indicates a value corresponding to ten times the frequency difference between the two input signals A and B. The counting time of the counter 3 may be determined in consideration of desired accuracy of measurement.

Figure 6:
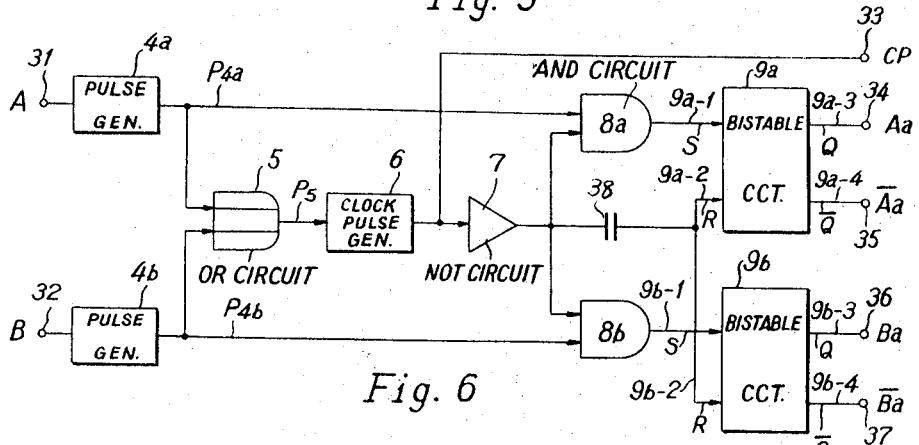
FIG. 6 is a block diagram illustrating an example of a signal converter used in the system of this invention.
Figure 7:
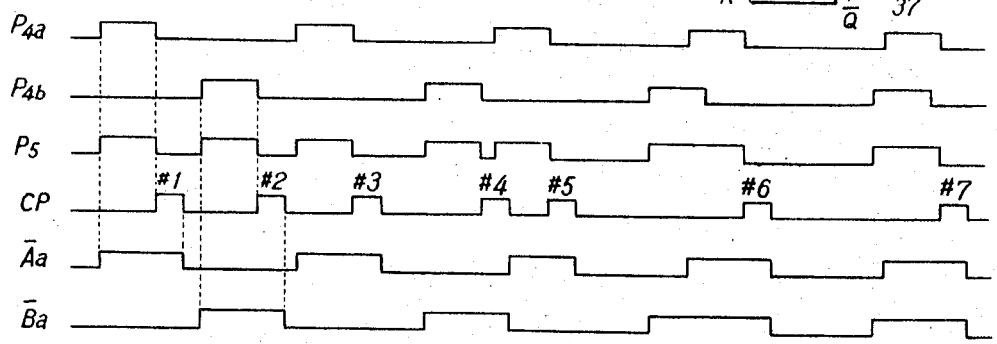
FIG. 7 is a time chart explanatory of the operation of the signal converter shown in FIG. 6.

With reference to FIGS. 6 and 7, an example of the signal converter 1 will now be described. The input signals A and B applied respectively to input terminals 31 and 32 are converted to pulse signals $P_{4a}$ and $P_{4b}$ (shown in FIG. 7) at pulse generators 4a and 4b respectively. Each of these pulse generators 4a and 4b comprises a monostable multivibrator or a blocking oscillator which generates an output pulse having a constant duration in response to every cycle of the input signal A or B. The constant duration of each of the output pulses $P_{4a}$ and $P_{4b}$ must be shorter than one half the period of the highest frequency in the input signals A and B. The outputs $P_{4a}$ and $P_{4b}$ are applied to an OR-circuit 5 and the set inputs 9a-1 and 9b-1 of bistable circuits 9a and 9b through AND-circuits 8a and 8b respectively. The output $P_5$ of the OR-circuit 5 triggers a clock pulse generator 6 so that clock pulses CP are generated at a terminal 33 in synchronism with the termination of every pulse of the output $P_5$. The clock pulse generator 6 is provided by the use of a monostable multivibrator or a blocking oscillator. The clock pulses CP are applied through a NOT-circuit 7 to both the AND-circuits 8a and 8b to check the outputs $P_{4a}$ and $P_{4b}$ of the pulse generators 4a and 4b during the duration of each of the clock pulses CP. The output of the NOT-circuit 7 is also applied to respective reset terminals 9a-2 and 9b-2 of the bistable circuit 9a and 9b through a differentiating capacitor 38 so as to reset both the bistable circuits 9a and 9b in synchronism with the end of each of the clock pulses CP.

With reference to FIG. 7, the operation of the signal converter 1 shown in FIG. 6 will be described. As understood from the time charts shown in FIG. 7, conditions required for the clock pulses CP and output pulse signals $\bar{A}a$ and $\bar{B}a$ are satisfied. If it is assumed that the high potential and the low potential correspond respectively to the state 1 and the state 0 in each of the time charts shown in FIG. 7, the states of the pulse signals $\bar{A}a$ and $\bar{B}a$ assume respectively the states 1 and 0 (hereinafter called as states "1 0") at the duration of the first pulse #1 of the clock pulses CP. The pulse signals $\bar{A}a$ and $\bar{B}a$ assumes the states "0 1," "1 0" and "0 1" at the durations of pulses #2, #3 and #4 of the clock pulses CP. Since the AND-circuit 8a is closed at each of the clock pulses CP, the bistable circuit 9a is not reset until the termination of each of the clock pulses CP. Thereafter, the pulse signals $\bar{A}a$ and $\bar{B}a$ assume successively states "1 0," "1 1" and "1 1" in response to pulses #5, #6 and #7 of the clock pulses CP.

The bistable circuit 9a and 9b are employed to synchronize (or delay) the end of each of pulses of the pulse signals $\bar{A}a$ and $\bar{B}a$ with (or from) the end of each of the clock pulses CP. To meet this requirement, the output pulses $P_{4a}$ and $P_{4b}$ are temporarily stored in the bistable circuits 9a and 9b respective and cleared in response to the end of each of the clock pulses CP.

The OR-circuit 5 is employed to control generation of the clock pulses CP in consideration of whether or not pulses of the outputs $P_{4a}$ and $P_{4b}$ of the pulse generators 4a and 4b are simultaneously generated. In other words, if two pulses of the outputs $P_{4a}$ and $P_{4b}$ are simultaneously generated, these two pulses become one pulse at the output of the OR-circuit 5, so that one of the clock pulses CP is generated from the clock pulse generator 6 in response to the end of the one pulse obtained at the output of OR-circuit 5. However, if pulses of the outputs $P_{4a}$ and $P_{4b}$ of the pulse generators 4a and 4b are separately generated in time, these two pulses become two output pulses at the output of the OR-circuit 5, so that two of the clock pulses CP are successively generated from the clock pulse generator 6 in response to the ends of the two pulses obtained at the output of the OR-circuit 5. To perform this operation, the duration of each of the output pulses $P_{4a}$ and $P_{4b}$ of the pulse generators 4a and 4b must be shorter than one-half the period of the highest frequency in the input signals A and B. In accordance with this condition, a requirement in which one of either the outputs $P_{4a}$ and $P_{4b}$ is not simultaneously generated with two of the other of the outputs $P_{4a}$ and $P_{4b}$ is satisfied. If the above-mentioned condition is not met so that one of the output $P_{4a}$ is simultaneously generated with two of the other output $P_{4b}$, one pulse is obtained at the output of the OR-circuit 5 so that one clock pulse is generated from the clock pulse generator 6 in response to this one pulse obtained at the output of the OR-circuit 5. Accordingly, the output of the bistable circuit 9b becomes one pulse even if the number of output pulses of the pulse generator 4b is two.

As mentioned above, the difference between respective frequencies of two input signals can be readily measured without use of the reversible counter which is generally used in the conventional system. Moreover, since a filter used in the conventional system is not necessary in the system of this invention, the system of this invention can measure the difference between respective frequencies of two input signals in a wide frequency range up to the responsible frequency of logical elements used in the system of this invention.

If two values in which the difference therebetween is to be measured are convertible to frequency information, this invention may be applied to measure these two values. It is allowable as understood from the principle of this invention that either or both of the two values applied to the system of this invention is/are constant.

What I claim is:

1. A counting system for measuring a difference between respective frequencies of a first input signal A and a second input signal B, comprising:

a signal converter converting said signals A and B respectively to a first pulse train Aa whose pulses are each timed with each of the cycles of the first input signal and to a second pulse train Ba whose pulses are each timed with each of the cycles of the second input signal B;

said signal converter comprising a first pulse generator receiving the first input signal A to generate a first setting pulse in response to each cycle of the first input signal A, a second pulse generator receiving the second input signal B to generate a second setting pulse in response to each cycle of the second input signal B, an OR circuit having two inputs connected respectively to outputs of the first and second pulse generators, a clock pulse generator connected to the output of the OR circuit to generate clock pulses each having a constant duration and timed with the end of each of the output pulses of the OR circuit, a NOT circuit connected to the output of the clock pulse generator, a first AND circuit having two inputs respectively connected to outputs of the first signal generator and the NOT circuit, a second AND circuit having two inputs respectively connected to outputs of the second pulse generator and the NOT circuit, a first bistable circuit set by the output pulse of the first AND circuit and reset by the output of the NOT circuit, and a second bistable circuit set by the output of the second AND circuit and reset by the output of the NOT circuit, the first pulse train Aa being obtained at the output of the first bistable circuit, the second pulse train Ba being obtained at the output of the second bistable circuit, a sequential logical circuit connected in cascade with the signal converter and having three possible states to generate an output pulse in response to every received pulse of at least one of the first pulse train Aa and the second pulse train Ba in a predetermined condition which is predetermined in accordance with the instant state of this sequential logical circuit and the instant states of the first pulse train Aa and the second pulse train Ba, so that the sequential logical circuit assuming a first state when a difference number between the respective numbers of received pulses of the first and second pulse trains Aa and Ba is equal to the number of generated output pulse or pulses, a second state when the difference number is larger than the number of generated output pulse or pulses and when the number of received pulses of the first pulse train A$a$ is larger than the number of received pulses of the second pulse train B$a$, and a third state when the difference is larger than the number of generated output pulse or pulses and when the number of received pulses of the first pulse train A$a$ is smaller than the number of received pulses of the second pulse train B$a$; and a counter connected to the output of the sequential logical circuit to count the number of output pulses of the sequential logical circuit in a desired time.

2. A counting system according to claim 1, in which the sequential logical circuit comprises a first input terminal receiving a first pulse signal obtained by inverting the state of the first pulse train A$a$, a second input terminal receiving a second pulse signal obtained by inverting the state of the second pulse train B$a$, a third input terminal receiving clock pulses each of which is synchronized with the end of each of pulses obtained by the logical OR of the first pulse train and the second pulse train, a third AND circuit having two inputs one of which is connected to the second input terminal, a fourth AND circuit having two inputs one of which is connected to the first input terminal, a third bistable circuit set by the output of the third AND circuit and reset by the first pulse signal applied from the first input terminal, a fourth bistable circuit set by the output of the fourth AND circuit and reset by the second pulse signal applied from the second input terminal, a fifth AND circuit having three inputs connected respectively to the second input terminal, one output of the third bistable circuit and the third input terminal, a sixth AND circuit having three inputs connected respectively to the first input terminal, one output of the fourth bistable circuit and the third input terminal, the other output of the third bistable circuit being connected to the other input of the fourth AND circuit, the other output of the fourth bistable circuit being connected to the other input of the third AND circuit, and a second OR circuit having two inputs respectively connected to the outputs of the fifth AND circuit and the sixth AND circuit, the output pulses the sequential logical circuit being obtained at the output of the second OR circuit.

3. A counting system for measuring a difference between respective frequencies of the first input signal A and the second input signal B, comprising:

a signal converter converting said signals A and B to a first pulse train A$a$ whose pulses are each timed with each of the cycles of the first input signal and to a second pulse train B$a$ whose pulses are each timed with each of the cycles of the second input signal B;

said signal converter comprising first and second pulse generators receiving said input signals A and B respectively, an OR circuit connected to the outputs of both said pulse generators, a clock pulse generator connected to the output of said OR circuit, and means connected to the outputs of said pulse generator and said clock pulse generator for producing said pulse trains A$a$ and B$a$ respectively, a sequential logical circuit connected in cascade with the signal converter and having three possible states to generate an output pulse in response to every received pulse of at least one of the first pulse train A$a$ and the second pulse train B$a$ in a predetermined condition which is predetermined in accordance with the instant state of this sequential logical circuit and the instant states of the first pulse train A$a$ and the second pulse train B$a$, so that the sequential logical circuit assuming a first state when a difference number between the respective numbers of received pulses of the first and second pulse trains A$a$ and B$a$ is equal to the number of generated output pulse or pulses, a second state when the difference number is larger than the number of generated output pulse or pulses and when the number of received pulses of the first pulse train A$a$ is larger than the number of received pulses of the second pulse train B$a$, and a third state when the difference is larger than the number of generated output pulse or pulses and when the number of received pulses of the first pulse train A$a$ is smaller than the number of received pulses of the second pulse train B$a$; and said sequential logical circuit comprising a first input terminal receiving from said signal converter a first pulse signal obtained by inverting the state of the first pulse train A$a$, a second input terminal receiving from said signal converter a second pulse signal obtained by inverting the state of the second pulse train B$a$, a third input terminal receiving clock pulses from said clock pulse generator each of which is synchronized with the end of each of pulses obtained by the logical OR of the first pulse train and the second pulse train, a first AND circuit having two inputs one of which is connected to the second input terminal, a second AND circuit having two inputs one of which is connected to the first input terminal, a first bistable circuit set by the output of the first AND circuit and reset by the first pulse signal applied from the first input terminal, a second bistable circuit set by the output of the second AND circuit and reset by the second pulse signal applied from the second input terminal, a third AND circuit having three inputs connected respectively to the second input terminal, one output of the first bistable circuit and the third input terminal, a fourth AND circuit having three inputs connected respectively to the first input terminal, one output of the second bistable circuit and the third input terminal, the other output of the first bistable circuit being connected to the other input of the second AND circuit, the other output of the second bistable circuit being connected to the other input of the first AND circuit, and a second OR circuit having two inputs respectively connected to the outputs of the third AND circuit and the fourth AND circuit, the output pulses the sequential logical circuit being obtained at the output of the second OR circuit, a counter connected to the output of the sequential logical circuit to count the number of output pulses of the sequential logical circuit in a desired time.

* * * * *